United States Patent [19]

Tsuchida et al.

[11] Patent Number: 5,655,012
[45] Date of Patent: Aug. 5, 1997

[54] PRIVATE BRANCH EXCHANGE APPARATUS

[75] Inventors: Kousuke Tsuchida; Sadaka Mitsuo, both of Kasuga, Japan

[73] Assignee: Matsushita Electric Industrial Co., Ltd., Japan

[21] Appl. No.: 510,051

[22] Filed: Aug. 1, 1995

Related U.S. Application Data

[63] Continuation of Ser. No. 45,082, Apr. 12, 1993, abandoned

[30] Foreign Application Priority Data

Apr. 14, 1992 [JP] Japan .................. 4-094014

[51] Int. Cl.$^6$ .................................. H04M 3/02
[52] U.S. Cl. .................. 379/178; 379/198; 379/251; 379/350; 379/373
[58] Field of Search .................. 379/156, 165, 379/172, 173, 177, 178, 179, 180, 181, 182, 187, 210, 211, 212, 198, 201, 219, 234, 251, 252, 258, 350, 373

[56] References Cited

U.S. PATENT DOCUMENTS

| | | | |
|---|---|---|---|
| 3,626,106 | 12/1971 | Greening et al. | 379/179 |
| 4,985,916 | 1/1991 | Tachuk et al. | 379/178 |
| 5,048,080 | 9/1991 | Bell et al. | 379/165 |
| 5,267,307 | 11/1993 | Izumi et al. | 379/210 |
| 5,291,549 | 3/1994 | Izumi | 379/212 |

FOREIGN PATENT DOCUMENTS 2574608  6/1986  France .................. 379/179

Primary Examiner—Krista M. Zele
Assistant Examiner—Scott L. Weaver
Attorney, Agent, or Firm—Rossi & Associates

[57] ABSTRACT

In a private branch exchange apparatus having a plurality of extension ports, each extension port capable of connecting a push button telephone and a general standard type telephone in parallel, when a call occurs at one extension port where the parallel connection has been done, a ring sound can be produced at the push button or standard type telephone selectively. An additional dialling provides the selection between the push button and the standard type telephone. A memory may specify either of the push button or standard type telephone to be ringed. A call between the push button telephone and the standard type telephone can be provided in accordance with the additional dialing or data stored in a memory.

7 Claims, 5 Drawing Sheets

CONTENTS OF MEMORY 14

| EXT PORT | DATA | MEANING |
|---|---|---|
| A | 1 | CONNECTED IN PARALLEL |
| B | 1 | CONNECTED IN PARALLEL |
| C | 0 | CONNECTED NOT IN PARALLEL |
|  |  |  |
| N | 0 | CONNECTED NOT IN PARALLEL |

CONTENTS OF MEMORY 15

| EXT PORT | DATA | MEANING |
|---|---|---|
| A | 2 | CALL THE SPECIFIED TEL |
| B | 1 | CALL BOTH TEL |
|  |  |  |
|  |  |  |
| N | 1 |  |

CONTENTS OF MEMORY 17

| EXT PORT | DATA | MEANING |
|---|---|---|
| A | 1 | PERMITED |
| B | 1 | INHIBITED |
| C | 0 | INHIBITED |
| | | |
| N | | |

PRIVATE BRANCH EXCHANGE APPARATUS

This is a Continuation of application Ser. No. 08/045,082 filed Apr. 12, 1993, now abandoned.

BACKGROUND OF THE INVENTION

1. Field of the Invention

This invention relates to a private branch exchange apparatus and particularly to a private branch exchange apparatus with a function for providing selective services to a push button telephone connected thereto with additional functions and to a general telephone without additional functions connected thereto in parallel to the push button telephone.

2. Description of the Prior Art

A private branch exchange apparatus is known. Such a prior art private branch exchange apparatus is connected to a plurality of push button telephones to provide communication with a telephone line and intercommunication between the push button telephones connected thereto. The prior art private branch exchange apparatus comprises extension ports, each having a speaking circuit for transmitting voice signals and a data communication circuit for communicating data, for example, information of ON HOOK or OFF HOOK, ring command data, or the like. A plurality of push button telephone are connected thereto to provide users various additional functions with the private branch exchange apparatus.

Another prior art private branch exchange apparatus referred to as a hybrid type electronic private branch exchange apparatus is known. Such a prior art private branch exchange apparatus has an external port capable of connection to both a push button telephone and a general telephone having only basic function in parallel.

However, in the prior art hybrid private branch exchange apparatus, there is a problem that when a call reaches to one of extension ports of the hybrid private branch exchange apparatus, both push button telephone and general telephone ring at the same time. That is, it is impossible to selectively ring either of them. Moreover, there is a problem that it is impossible for either of the push button and general telephone connected to the same extension port to call the other one by using ringing.

SUMMARY OF THE INVENTION

The present invention has been developed in order to remove the above-described drawbacks inherent to the conventional private branch exchange apparatus.

According to this invention there is provided a private branch exchange apparatus having a plurality of extension ports and a channel control circuit, each of the extension ports having a terminal; a first data communication circuit for communicating control data including a first dial signal in cooperation with a first telephone having a second data communication circuit for communicating with the first data communication circuit; a ring signal generation circuit for generating and outputting a ring signal at the terminal; and a dial signal detection circuit for detecting a second dial signal at the terminal, the channel control circuit providing a communication passage between a telephone line coupled to the private branch exchange apparatus and the terminal of one of the extension ports and between the terminals of the extension ports in response to a channel control signal, each of the terminal being provided for coupling, in parallel, the channel control circuit to the first telephone which further has a first ring sound generation circuit responsive to the control data for generating a first ring sound and to a second telephone having a second ring sound generation circuit for generating a second ring sound in response to the ring signal, the private branch exchange apparatus further comprising: a dial signal analyzing circuit for detecting the first and second dial signals from one of the extension ports and for analyzing the first and second dial signals to produce a dialed number; and a control circuit responsive to the dialed number for effecting first and second functions in accordance with a control signal, the first function generating the channel control signal and for causing the first data communication circuit of one of the extension ports selected in accordance with the dialed number to send the control data to the second data communication circuit of the first telephone in order to cause the first ring sound generation circuit to generate the second ring sound, the second function causing the ring signal generation circuit of the selected one of the extension ports to generate and send the ring signal to the second ring sound generation circuit of the second telephone.

According to the present invention there is also provided a private branch exchange apparatus having a plurality of extension ports and channel control circuit, each of the extension ports having a terminal; a first data communication circuit for communicating control data including first dial signal with a first telephone having a second data communication circuit for communicating with the first data communication circuit; a ring signal generation circuit .for generating and outputting a ring signal at the terminal; and a dial signal detection circuit for detecting a second dial signal at the terminal, the channel control circuit providing a communication passage between a telephone line coupled to the private branch exchange apparatus and the terminal of one of the extension ports and between the terminals of the extension ports in response to a channel control signal, each of the terminal being provided for coupling, in parallel, the channel control circuit to the first telephone which further has a first ring sound generation circuit responsive to the control data for generating a first ring sound and to a second telephone having a second ring sound generation circuit for generating a second ring sound in response to the ring signal, the private branch exchange apparatus comprising: a dial signal analyzing circuit for detecting the first and second dial signals from one of the extension ports and for analyzing the first and second dial signals to produce a dialed number; a memory for storing data indicating either of first and second conditions; and a control circuit responsive to said data for effecting the first and second functions, the first function generating the channel control signal and for causing the first data communication circuit of one of the extension ports selected in accordance with the dialed number to send the control data to the second data communication circuit of the first telephone in order to cause the first ring sound generation circuit to generate the second ring sound, the second function causing the ring signal generation circuit of the selected one of the extension ports to generate and send the ring signal to the second ring sound generation circuit of the second telephone, wherein the control circuit effects the first and second functions at the substantially same time when the data is indicative of the first condition and the control circuit effects either of the first function and second function in accordance with a command signal when the data is indicative of the second condition.

According to the present invention there is further provided a private branch exchange apparatus having a plurality of extension ports and channel control circuit, each of the extension ports having a terminal; a first data communication circuit for communicating control data including first dial signal with a first telephone having a second data communication circuit for communicating with the first data communication circuit; a ring signal generation circuit for generating and outputting a ring signal at the terminal; and a dial signal detection circuit for detecting a second dial signal at the terminal, the channel control circuit providing a communication passage between a telephone line coupled to the private branch exchange apparatus and the terminal of one of the extension ports and between the terminals of the extension ports in response to a channel control signal, each of the terminal being provided for coupling, in parallel, the channel control circuit to the first telephone which further has first ring sound generation circuit responsive to the control data for generating a first ring sound and to a second telephone having a second ring sound generation circuit for generating a second ring sound in response to the ring signal, the private branch exchange apparatus comprising: a dial signal analyzing circuit for detecting the first and second dial signals from one of the extension ports and for analyzing the first and second dial signals to reproduce a dialed number indicative of each of the extension ports; a first detection circuit for detecting which extension port receives the first dial signal; a second detection circuit for detecting which extension port receives the second dial signal; a third detection circuit for detecting whether or not one of the extension port indicated by the dialed number agrees with the extension port detected by the first or second detection circuit; and a control circuit responsive to the first to third detection circuit and the dialed number for causing the first data communication circuit of one of the extension ports selected in accordance with the dialed number to send the control data to the second data communication circuit of the first telephone in order to cause the first ring sound generation circuit to generate the second ring sound when the second detection circuit detects the second dial signal and for causing the ring signal generation circuit of the selected one of the extension ports to generate and send the ring signal to the second ring sound generation circuit of the second telephone when the first detection circuit detects the first dial signal.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described an embodiment of this invention with reference to drawings.

Figure 1:
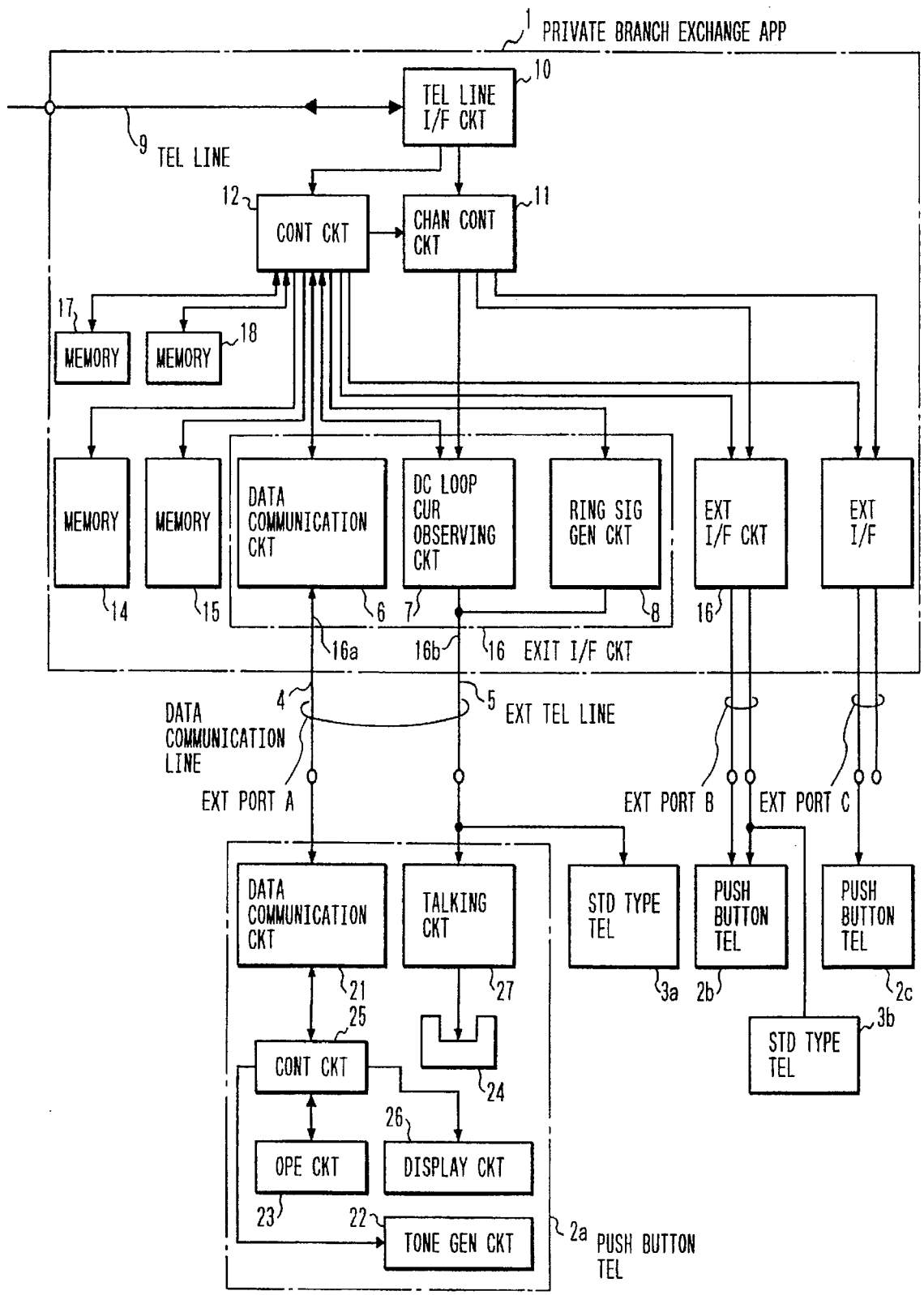
FIG. 1 is a block diagram of an embodiment of a private branch exchange apparatus of this invention.

FIG. 1 is a block diagram of the embodiment of a private branch exchange apparatus of this invention. A private branch exchange apparatus 1 provides a service of communication between a telephone line 9 coupled thereto and extension telephones coupled thereto and a service of intercommunication between the extension telephones. Numeral 2a, 2b, or 2c is a push button telephone connected to the private branch exchange apparatus 1 as an extension telephone.

Numeral 3a or 3b is a standard type (general) telephone connected to an extension port included in the private branch exchange apparatus in parallel to the push button telephone 2a or 2b. The standard type telephone 3a or 3b is capable of being independently used when coupled to the telephone line 9 as well known. Numeral 4 is a data communication line to be connected to the push button telephone 2a, 2b, or 2c. Numeral 5 denotes an extension telephone line for coupling a talking circuit of the push button telephone 2a, 2b, or 2c and/or a standard type telephone 3a or 3b to an extension telephone line terminal 16b of the extension interface circuit 16. In FIG. 1, the push button telephones 2a and 2b and the standard type telephone 3a and 3b are connected in parallel respectively for example.

Numeral 16 denotes an extension interface circuit (I/F) circuit 16 which comprises: a data communication circuit 6 for communicating data with the push button telephone 2a, 2b, or 2c through the data communication line 4; a dc loop current observing circuit 7 for observing a dc loop current flowing through the extension telephone line 5 and for detecting dial pulses sent from the standard type telephone 3a or 3b; and a ring signal generation circuit 8 for generating a ring signal and sending it to the extension telephone line 5 on reception of a call to ring the standard type telephone 3a or 3b.

Numeral 10 denotes a telephone line interface (I/F) circuit 10 coupled to the telephone line 9 for communicating with the telephone line 9. Numeral 11 denotes a channel control circuit 11 for controlling of the formation of one or more channels for communication between the telephone line 9 and one of extension telephone lines 5 and between extension telephone lines 5.

Numeral 12 denotes a control circuit. The control circuit 12 controls the data communication circuit 6, the dc loop current observing circuit 7, the ring signal generation circuit 8, the dial signal analyzing circuit 13, and memories 14, 15, 17, and 18 in accordance with information from the data communication circuit 6, the dc loop current observing circuit 7, and the telephone line interface circuit 10. The data communication circuit 6, the dc loop current observing circuit 7, and the ring signal generation circuit 8 form an extension interface circuit 16 having a data communication terminal 16a connected to the data communication circuit 6 and the extension telephone line terminal 16b to which outputs of the dc loop current observing circuit 7 and the ring signal generation circuit 8 are connected. The data communication terminal 16a and the extension telephone line terminal 16b forms an extension port A. The private branch exchange apparatus of this embodiment has extension ports A to C.

Figures 4, 5A, 5B:
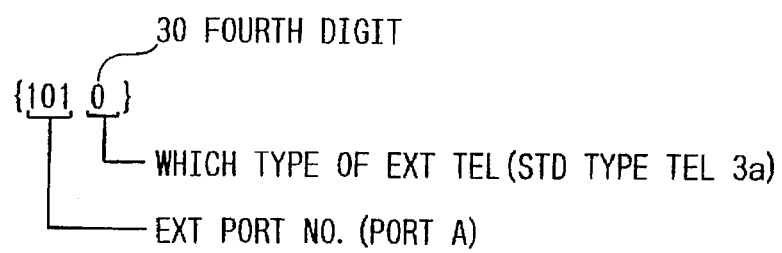
FIG. 4 is a table of this embodiment for showing an example of content of a memory 14 shown in FIG. 1.
FIG. 5A is a table of this embodiment for showing an example of content of a memory 15 shown in FIG. 1.
FIG. 5B is an illustration of this embodiment for showing this dialing operation.

The memory 14 stores information indicating whether or not the parallel connection of the push button telephone 2a, 2b, or 2c and the standard type telephone 3a or 3b has been made. FIG. 4 is a table of this embodiment for showing an example of content of the memory 14. In FIG. 4, data corresponding to the extension port A is set to one. That is, data of "one" is stored at an address corresponding to the external port A. This means that the extension port A is connected to the standard type telephone 3a and the push button telephone 2a in parallel. Data corresponding to the extension port B is set to one. This means that the extension port B is connected to the standard type telephone 3b and the push button telephone 2b in a parallel condition. Data corresponding to the extension port C is set to zero. This means that the extension port A is not connected to the standard type telephone 3a or 3b but to the push button telephone 2c.

The memory 15 stores information indicating whether bells of both push button telephone 2 and the standard type telephone 3 are ringed or either of them are ringed. That is, the memory 15 stores the information how to call by the push button telephone 2 or the standard telephone 3. FIG. 5A is a table of this embodiment for showing an example of content of the memory 15. In FIG. 5A, data corresponding to the extension port A is set to two. That is, data of "two" is stored at an address corresponding to the external port A. This means that the control circuit 12 calls either of telephone specified by data additionally sent with a extension dial number. That is, the control circuit 12 calls either of the push button telephone 2 or the standard type telephone 3 in accordance with a special number dialed after dialing of the extension dial number of the extension port A. Data corresponding to the extension port B is set to one. This means that the control circuit 12 calls both of the push button telephone 2b and the standard type telephone 3b connected to the extension port B when a call reached to the extension port B.

For example, it is assumed that an operator using the extension telephone line 5 of an extension port C and calls the standard type telephone 3a connected to the extension port A to which the push button telephone 2a and the standard type telephone 3a are connected in parallel. The operator dials {101} which means the extension port A and then dials {0}. That is, the operator dials {101 0}. The control circuit 12 of the private branch exchange apparatus 1 detects the dialed numbers and checks the memory 15 with the digits from the first to third of the detected extension telephone number. Then, the control circuit 12 recognizes the call requesting communication with the extension port A with data {101} and then, checks data corresponding to the extension port A stored in the memory 15. The data is set to two, then the control circuit 12 determines to call the standard type telephone 3a with the fourth digit {0} which means the standard type telephone 3. FIG. 5B is an illustration of this embodiment for showing this dialing operation. That is, the first three digit means the requesting the extension port A and the fourth digit means the request of the standard type telephone 3a.

The memory 17 stores information indicating whether a calling of the telephone connected to the same extension port is permitted or inhibited.

The control circuit 12 comprises a well-known microprocessor having a ROM, a RAM, input ports, and output ports. In fact, the memories 14, 15, 17, and 18 are included in the microprocessor. The data communication circuit 6 and the dc loop current observing circuit 7 of each of extension interface circuits 16 are coupled to the microprocessor 12 through input ports and output ports of the microprocessor 12, so that the microprocessor 12 can detect which extension port requests communication.

The push button telephone 2a, 2b, or 2c comprises a data communication circuit 21 for communicating data with the data communication circuit 6 of the private branch exchange apparatus 1 through the data communication line 4; a talking circuit 27 for communication of voice signals between a hand set 24 and telephone line 9 or other extension telephone through the extension telephone line 5; an operation circuit 23 for producing a dialing signal, etc.; a display circuit 26 for displaying information for an operator; a tone generating circuit 22 for generating an audio tone, such as a ring sound, for the operator; and a control circuit 25 for controlling the display circuit 26 and the tone generating circuit 22 in accordance with data from the data communication circuit 21 and command signals or dial signals from the operation circuit 23. The display circuit 26 informs the operator that this terminal is being used or other terminal is being used with a lamp (not shown). The standard type telephone 3a is connected to the extension telephone line 5 in parallel to the talking circuit 27 as shown in FIG. 1.

Figure 2:
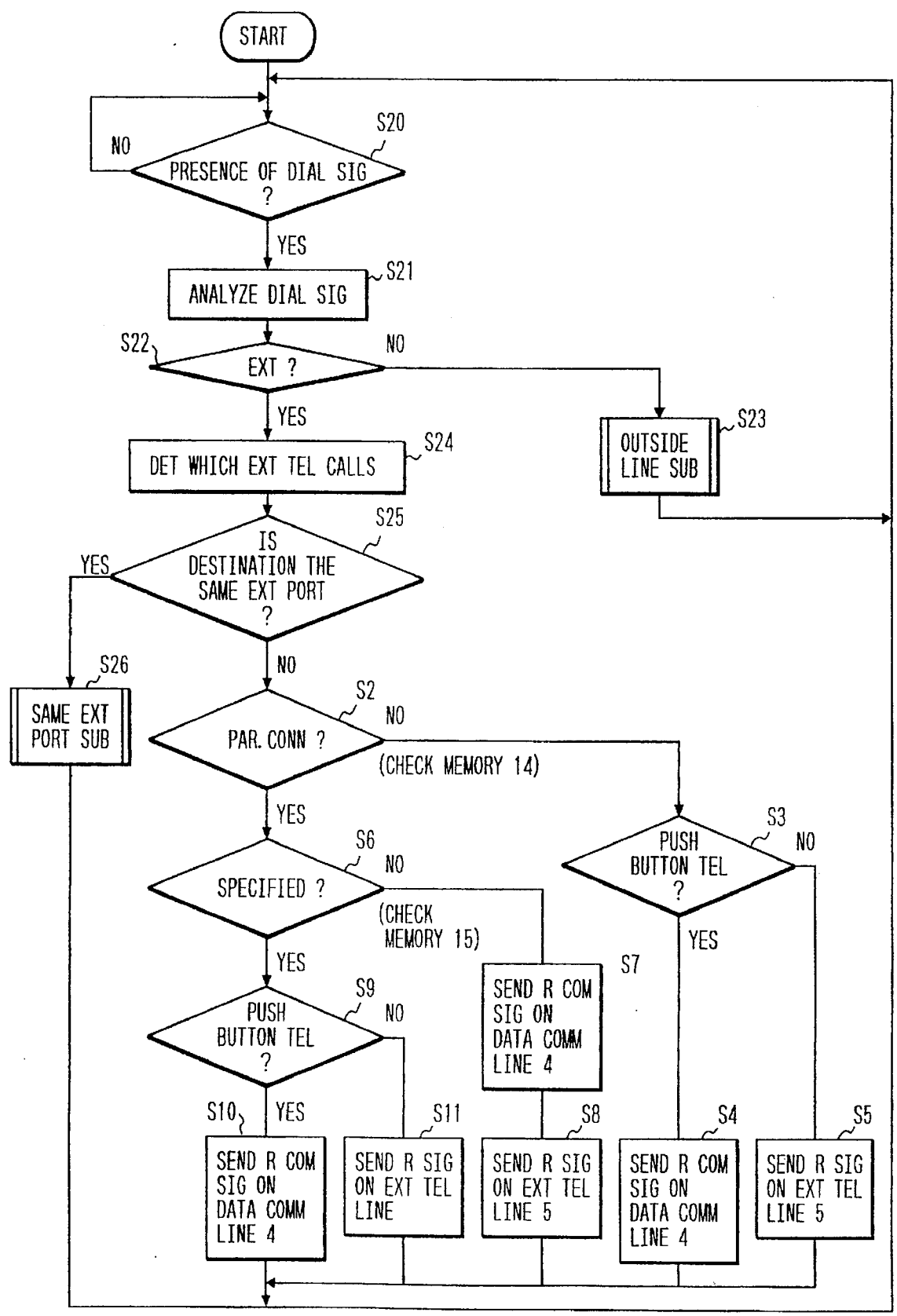
FIG. 2 shows a flow chart showing an operation of this embodiment of this invention.

Hereinbelow will be described operation with reference to FIG. 2. FIG. 2 shows a flow chart showing the operation of this embodiment of this invention. The control circuit 12 executes the program represented by FIG. 2 when an interconnection between extension telephones connected to the private branch exchange apparatus 1 is requested by the dial signal.

In step s20, the control circuit 12 checks whether or not a dial signal detected by the dc loop current observing circuit 7 or data communication circuit 6 is present. If the dial signal is absent, processing loops there. If the dial signal is present (YES), processing proceeds to step s21. In step s21, the control circuit 12 analyzes the dial signal, that is, the control circuit 12 detects each digit of dialed number. In the following step s22, the control circuit 12 checks wether or not a destination indicated by the dialed number is an external telephone 2a-2c or 3a, 3c. If the destination is directed to the outside line, i.e., telephone line 9 (NO), processing proceeds to outside line subroutine s23. The description of this processing is omitted because this process is well known and is not directly concerned to this invention. In step s22, if YES, processing proceeds to step s24. In step s24, the control circuit 12 detects which extension telephone calls by checking input ports of the control circuit 12. In the following step s25, a decision is made as to whether or not the telephone of the destination is connected to the same extension port as the calling telephone is connected. If the telephone of the destination is connected to the same extension port as the calling telephone is connected (YES), processing proceeds to a same extension port subroutine s26 which will be described latter. If the telephone of the destination is connected to the other extension port(NO), processing proceeds to step s2.

In step s2, the control circuit makes a decision as to whether or not the parallel connection of the push button telephone and the standard type telephone has been done by checking data stored in the memory 14 at an address corresponding to an extension port of the destination. If the parallel connection has not been done (NO), processing proceeds to step s3. In step s3, the control circuit makes a decision as to whether the telephone of the destination is a push button or a standard type telephone by checking the fourth digit 30 of dialed telephone number detected and analyzed at step s21. If the telephone of the destination is a push button telephone 2a, 2b, or 2c, the control circuit 12 causes the data communication circuit 6 to send a ring command signal on the data communication line 4 of the port of the destination. If the telephone of the destination is a standard type telephone 3a or 3b, the control circuit 12 causes the ring signal generation circuit 8 to send a ring signal on the extension telephone line 5 of the port of the destination.

In step s2, if the parallel connection has been done (YES), processing proceeds to step s6. In step s6, the control circuit 12 makes a decision as to whether data stored in the memory 15 at an address corresponding to the extension port of the destination indicates "CALL THE SPECIFIED TELEPHONE" or "CALL BOTH TELEPHONE". If the data indicates "CALL BOTH TELEPHONE" (NO), the control circuit 12 causes the data communication circuit 6 to send the ring command signal on the data communication line 4 of the port of the destination in step s7 and causes the ring signal generation circuit 8 to send the ring signal on the extension telephone line 5 of the port of the destination in step s8.

In step s6, if the data indicates "CALL THE SPECIFIED TELEPHONE" (YES), the control circuit 12 makes a decision as to whether the telephone of the destination is a push button 2a–2c or a standard type telephone 3a or 3b by checking the fourth digit 30 of dialed telephone number detected and analyzed at step s21. If the telephone of the destination is a push button telephone 2a, 2b, or 2c, the control circuit 12 causes the data communication circuit 6 to send the ring command signal on the data communication line 4 of the port of the destination in step s10. If the telephone of the destination is a standard type telephone 3a or 3b, the control circuit 12 causes the ring signal generation circuit 8 to send the ring signal on the extension telephone line 5 of the port of the destination in step s11.

In the push button telephone 2a, 2b, or 2c, the ring command signal sent from the data communication circuit 6 is received by the data communication circuit 21 which sends it to the control circuit 25. The control circuit 25 causes the tone generation circuit 22 to generate a ring sound. The ring signal sent from the ring signal generation circuit 8 is received by the standard type telephone 3a or 3b which generate a ring sound as well known.

Hereinbelow will be described operation of calling between telephones connected to the same extension line, that is, the subroutine s25 mentioned above.

Figures 6, 7:
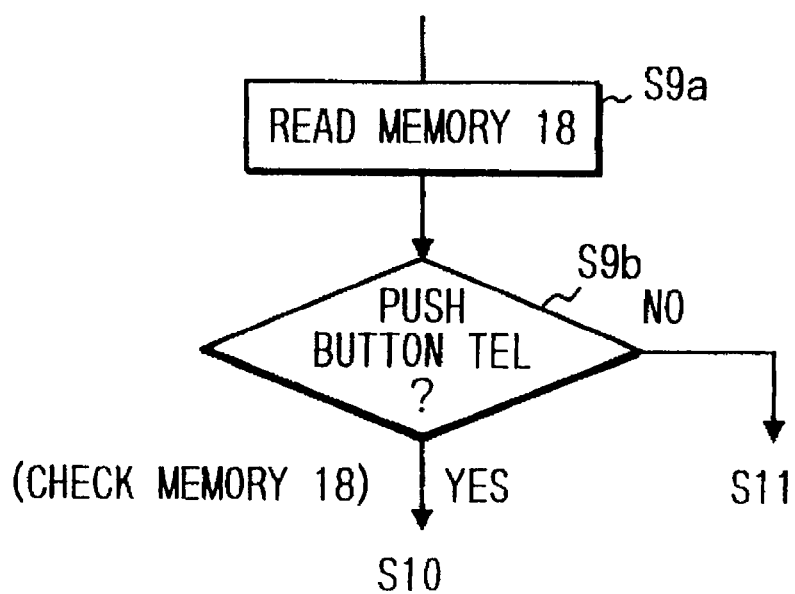
FIG. 6 is a table of this embodiment for showing an example of content of a memory 17 shown in FIG. 1.
FIG. 7 shows a partial flow chart of a modified embodiment.

The memory 17 stores information indicating whether a calling of the telephone connected to the same extension port is permitted or inhibited. FIG. 6 is a table of this embodiment for showing an example of content of the memory 17. In FIG. 6, data corresponding to the extension port A is set to one. That is, data of "one" is stored at an address corresponding to the external port A in the memory 17. This means that the telephone connected to the same extension port is permitted. Data corresponding to the extension port B is set to zero. This means that the telephone connected to the same extension port is inhibited.

Figure 3:
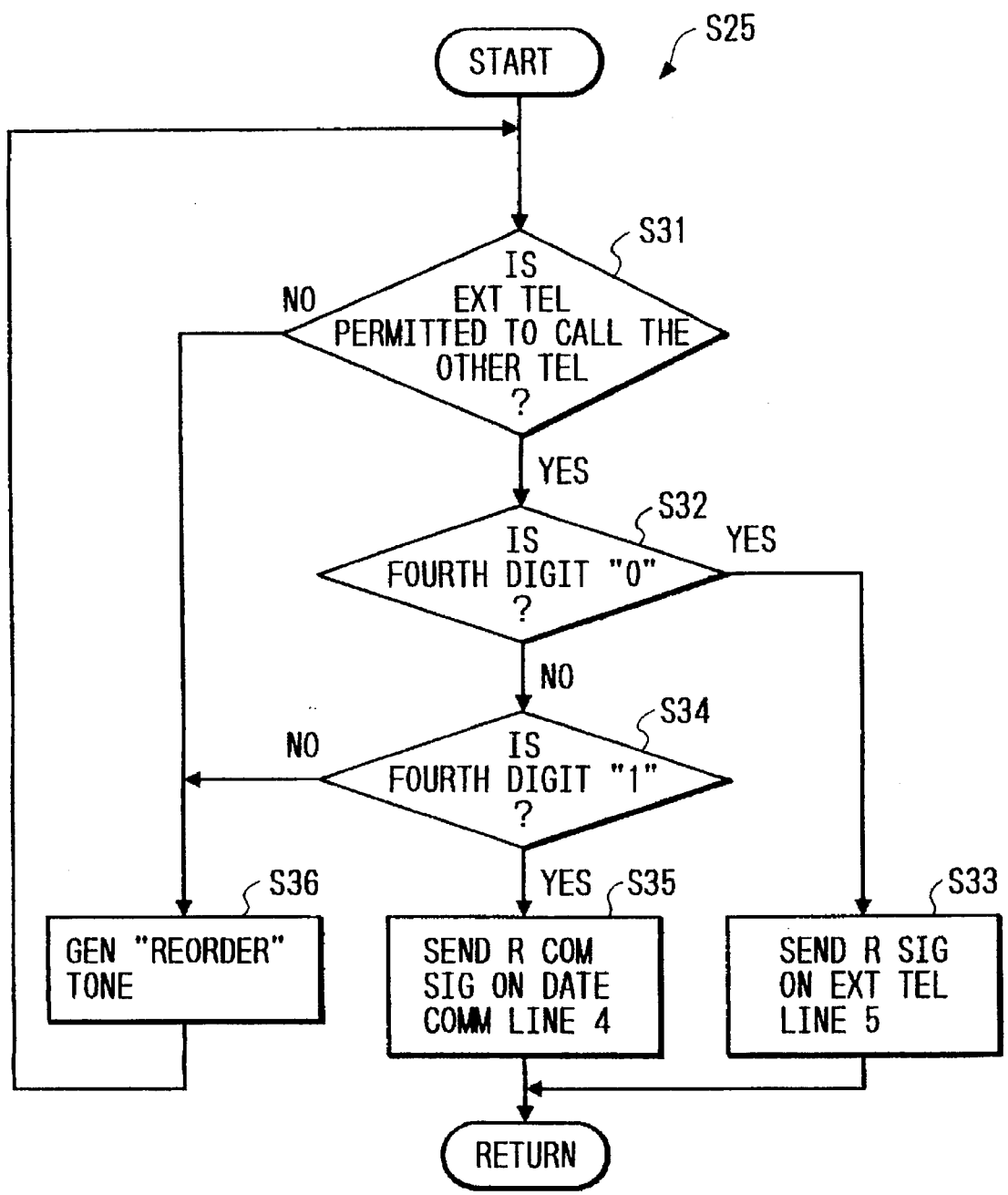
FIG. 3 shows a flow chart of this embodiment showing a subroutine shown in FIG. 2.

FIG. 3 shows a flow chart of this embodiment showing the subroutine s25 shown in FIG. 2.

After processing of steps s24 and s25, that is, the control circuit 12 detects which extension telephone calls and whether or not the calling extension calls the other extension connected to the same extension port, processing proceeds to step s31. In step s31, the control circuit 12 makes a decision as to whether or not the extension telephone connected to the same extension port is permitted to call the other by checking the memory 17. That is, the control circuit 12 reads data in the memory 17 at an address corresponding to the extension port and checks that the data is "1" which means "permission". If the extension telephone connected to the same extension port is permitted to call the other extension telephone (YES), processing proceeds to step s32. If NO, processing proceeds to step s36. In step s32, the control circuit 12 makes a decision as to whether the fourth digit 30 of dialed telephone number detected and analyzed at step s21 is "0". If the data is "0" (YES), namely, the telephone of the destination is a standard type telephone 3a or 3b, the control circuit 12 causes the ring signal generation circuit 8 to send the ring signal on the extension telephone line 5 of the port of the destination in step s33. If the data is "1", namely, the telephone of the destination is a push button telephone 2a, 2b, or 2c, the control circuit 12 causes the data communication circuit 8 to send the ring command signal on the data communication line 4 of the port of the destination in step s35. In the step s36, the control circuit 12 causes the data communication circuit 6 to send a reorder tone command signal to the control circuit 25 of the push button telephone 2a, 2b, or 2c when the type of the calling extension telephone which is detected in step s24 is push button telephone 2a, 2b, or 2c. When the type of the calling extension telephone is a standard type which is detected in step s24, the control circuit 12 causes the ring signal generation circuit 8 to send a reorder tone signal to the standard type telephone 3a.

In the push button telephone 2a, 2b, or 2c, the control circuit 25 causes the tone generation circuit 22 to generate the reorder tone on reception of the reorder tone command signal and the ring sound on reception of the ring command signal sent from the data communication circuit 6. The ring signal generation circuit 8 generates the reorder tone when it receives a control signal indicative of the reorder tone signal from the control circuit 12 and the ring sound when it receives the other control signal indicative of the ring signal. The reorder tone is well known in the art of the private branch exchange apparatus and is generated such that a short interval tone is successively repeated to warning the operator of a miss operation of dialing.

FIG. 7 shows a partial flow chart of a modified embodiment. In this modified embodiment, the steps s9 in FIG. 2 is replaced by step s9a and s9b. That is, processing is branched off in accordance with data stored in the memory 18. In step s9a, the control circuit 12 reads data stored in the memory 18 at an address corresponding to the external port. In the following step s9b, the control circuit 12 makes a decision as to whether or not the read data indicates the push button telephone. Processing proceeds to step s10 if the answer is YES and to step s11 if the answer is NO.

As mentioned above, according to the private branch exchange apparatus of this invention, if a push button telephone and a standard type telephone connected to the same extension port in parallel, it is possible for an operator using an extension telephone to call either of the push button telephone or the standard telephone selectively. Moreover, it is possible to call the other telephone connected in parallel and communicate therebetween. Further, it is possible to forward a reception of call to either of the push button telephone or the standard telephone selectively. Moreover, it is possible to forward a call to the other telephone connected in parallel.

What is claimed is:

1. A private branch exchange apparatus comprising:

a plurality of extension ports each including a data communication line and an extension telephone line;

a plurality of extension interface circuits corresponding to the extension ports: wherein each extension interface circuit is coupled to the data communication line and the extension telephone line of a corresponding one of the extension ports and detects a dial signal present on at least one of the data communication line and the extension telephone line;

first data storage means for storing data indicative of whether each of the extension ports is coupled to parallel connected telephones of first and second types;

second data storage means for storing data indicative of whether the parallel connected telephones coupled to one of the extension ports, indicated as being coupled to parallel connected telephones by the data stored in the first data storage means should be rung together or separately;

control means for receiving the dial signal, indicative of a destination, from one of the extension interface circuits and controlling the operation of the extension interface circuits to supply at least one of a first ring signal to a data communication line of an extension port corresponding to the destination when the first type of telephone including a data communication circuit is being called, and a second ring signal to the extension telephone line of the extension port corresponding to the destination when the second type of telephone without a data communication circuit is being called;

wherein the control means controls the operation of the extension interface circuits based on the data stored in the first and second data storage means to simultaneously supply both the first and second ring signals when the data stored in the first and second data storage means indicates that the extension port corresponding to the destination is coupled to the parallel connected telephones and the parallel connected telephones connected to the extension port corresponding to the destination are to be rung together;

a third data storage means for storing data indicative of whether the parallel telephones connected to one of the extension ports can be interconnected; and wherein, when the destination is within the same extension port corresponding to the extension interface circuit from which the dial signal is received, the control means controls the interface circuit corresponding to the same extension port based on the data stored in the third data storage means to: (a) supply at least one of the first ring signal to the data communication line of the same extension port and the second ring signal to the extension telephone line of the same extension port based on the type of telephone being called when the data stored in the third data storage means indicates interconnection is permitted; and (b) supply a reorder signal to at least one of the data communication line and the extension telephone line of the same extension port when the data stored in the third data storage means indicates interconnection is not permitted.

2. A private branch exchange apparatus as claimed in claim 1, wherein each of the extension interface circuits includes a data communication circuit coupled to the data communication line of the extension interface circuit's corresponding extension port, and a current observing circuit and a ring signal generation circuit coupled to the extension telephone line of the extension interface circuit's corresponding extension port.

3. A private branch exchange apparatus as claimed in claim 2, wherein the data communication circuit of each extension interface circuit detects whether the dial signal is present on the data communication line coupled thereto, and the current observing circuit detects whether the dial signal is present on the extension telephone line coupled thereto.

4. A private branch exchange apparatus as claimed in claim 2, wherein the data communication circuit generates the first ring signal, and the ring signal generation circuit generates the second ring signal.

5. A private branch exchange apparatus as claimed in claim 1, wherein the control means determines the type of telephone being called based on telephone type data included in the dial signal.

6. A private branch exchange apparatus as claimed in claim 1, further comprising a memory coupled to the control means for storing telephone type data indicative of the type of telephone connected to each of the extension ports, and wherein the control means determine the type of telephone being called based on the telephone type data stored in the memory.

7. A private branch exchange apparatus as claimed in claim 1, wherein said first type of telephone is a push button telephone including a data communication circuit and said second type of telephone is a standard type of telephone.

* * * * *